United States Patent [19]

Joyce

[11] 4,035,710
[45] July 12, 1977

[54] PULSE WIDTH MODULATED VOLTAGE REGULATOR-CONVERTER/POWER CONVERTER HAVING MEANS FOR IMPROVING THE STATIC STABILITY CHARACTERISTICS THEREOF

[75] Inventor: James Maurice Joyce, Boca Raton, Fla.

[73] Assignee: International Business Machines Corporation, Armonk, N.Y.

[21] Appl. No.: 624,203

[22] Filed: Oct. 20, 1975

[51] Int. Cl.² ............................... H02M 3/335
[52] U.S. Cl. ........................... 363/37; 323/17; 323/DIG. 1; 363/89
[58] Field of Search ................ 321/2, 10, 18, 20; 323/17, 22 T, DIG. 1

[56] References Cited
U.S. PATENT DOCUMENTS

| | | | |
|---|---|---|---|
| 1,593,355 | 7/1926 | Prince | 321/2 |
| 3,443,194 | 5/1969 | Cielo | 321/2 |
| 3,443,195 | 5/1969 | Hoffman et al. | 321/2 |

Primary Examiner—A. D. Pellinen
Attorney, Agent, or Firm—Kenneth W. Hairston; John G. Wynn

[57] ABSTRACT

Instability effects over a wide range of static load current conditions in a conventional pulse width modulated (PWM) voltage regulator-converter/power converter circuit configuration having cascaded LC—LC filter networks are eliminated by replacing an inductor, in the averaging filter section of the voltage regulator-converter with the primary winding of a transinductor and by placing the secondary winding thereof in series with an inductor in the output filter section of the power converter. The aforementioned transinductor, in combination with other elements of the system, is designed and configurated such that the closed-loop stability characteristics approach that of a two pole system while maintaining the superior filtering characteristics of a four pole system.

3 Claims, 3 Drawing Figures

PULSE WIDTH MODULATED VOLTAGE REGULATOR-CONVERTER/POWER CONVERTER HAVING MEANS FOR IMPROVING THE STATIC STABILITY CHARACTERISTICS THEREOF

BACKGROUND OF THE INVENTION

1. Field of the Invention

This invention relates generally to improvements in the stability characteristics of switched voltage regulators, and more particularly, to improvements in the stability characteristics of a pulse width modulated voltage regulator-converter/power converter having cascaded LC—LC filter networks.

2. Description of the Prior Art

In the recent past, pulse width modulated voltage regulator—converter/power converter systems have found wide use in military and commercial equipment due mainly to high performance and reliability. However, there are some problems encountered with prior art systems, especially when the systems are required to operate with a range of bulk voltages and under varying complex static load conditions, such as in high performance computer systems. A basic requirement of any voltage regulator-converter/power converter system is to maintain load regulation to the input switching regulator, sometimes termed "pre-regulator," by providing feedback from the pre-regulated output to the switching regulator or in the alternative, providing feedback from the output load to the pre-regulator.

FIG. 1 depicts a prior art voltage regulator—converter/power converter showing the connections for both types of feedback aforementioned. Usually, only one type of feedback is utilized in any one power supply although it is feasible, but with penalties in cost, to use both. Generally, the system is comprised of a regulator-converter section 10, an averaging filter section 12, a power converter section 14, a power converter filter section 16 and a pulse width modulated/clock/logic system control 18. In addition, for purposes of maintaining load regulation, a type A feedback network 20 or a type B feedback network 22 is provided. Regulator—converter section 10 includes a regulator converter interstage transformer 24 and a regulator converter power transistor 26. Averaging filter 12 includes a flyback diode $D_1$, an inductor $L_1$ and a shunt capacitor $C_1$ connected to ground. Also, power converter 14 includes a power converter interstage transformer 28, first and second power converter transistors 30 and 32 and power converter output transformer 34. Power converter filter 16 includes a pair of rectification diodes $D_2$ and $D_3$ connected in a full rectification configuration, an inductor $L_2$ and a shunt capacitor $C_2$ connected to ground. Load impedance $Z_0$ is representative of the various loads that the system of FIG. 1 can drive.

Considering first a system utilizing type A feedback, pulse width modulated/clock/logic system control 18 generates switching pulses which turn regulator converter power transistor 26 on and off at the frequency rate generated. Accordingly, a voltage with an amplitude substantially equal to the bulk voltage $V_1$ and at the frequency of operation is filtered by averaging filter 12. The values of inductor $L_1$ and shunt capacitor $C_1$, generally, are chosen so that there is some voltage fluctuation or ripple voltage in the regulated voltage $V_2$. In addition, flyback diode $D_1$ ensures that voltage transients due to the inductance of inductor $L_1$ are clamped to ground when regulator converter power transistor 26 is off. A portion of regulated voltage $V_2$ is connected in type A feedback network 20 and applied to pulse width modulated/clock/logic system control 18 modulating the switching pulses generated therein in accordance with the variations in regulated voltage $V_2$. Switching pulses are also generated from pulse width modulated/clock/logic system control 18 driving first and second power converter transistors 30 and 32 via power converter interstage transformer 28 in an alternating fashion. Regulated voltage $V_2$, in addition to being applied to type A feedback network 20, is also applied to the center tap of power converter output transformer 34. Finally, the switched voltage at primary windings $N_1$ and $N_2$ of power converter output transformer 34 is stepped down and coupled to the secondary windings $N_3$ and $N_4$ thereof. The power converter stage 14 is connected in a push-pull configuration, accordingly, the secondary voltage is full wave rectified by rectification diodes $D_2$ and $D_3$ and filtered by inductor $L_2$ and capacitor $C_2$ providing an output voltage $V_3$.

Briefly summarizing, in a system utilizing type A feedback, regulated voltage $V_2$ is sampled by type A feedback network 20 and applied to associated circuitry, aforementioned, maintaining thereby, a fixed voltage, i.e., $V_2$, to power converter 14. Power converter output transformer 34 steps down the aforementioned fixed voltage providing, after filtering by power converter filter 16, a regulated output voltage $V_3$. The principle disadvantage of a system utilizing type A feedback is the poor load regulation (typically plus or minus 10 percent due mainly to the feedback voltage at the input to type A feedback network 20 being isolated from the output load $Z_0$. However, systems utilizing type A feedback do provide a stable form of regulation since the inductor-capacitor pole pair, i.e., $L_1$–$C_1$, is located in the left-half S-plane.

Still referring to FIG. 1, type B feedback network 22 represents a prior art attempt to improve the poor regulation associated with utilizing type A feedback network 20 aforementioned. Type B feedback network 22, as depicted, closes the loop from the output of the power converter filter 16 to pulse width modulated/clock/logic system control system 18 including, now, within the loop, inter alia, averaging filter 12 and power converter filter 16. This connection does improve load regulation; however, stability problems are generally encountered because of the cascaded filter networks, $L_1C_1$–$L_2C_2$. In addition, the system becomes less stable as system gain is increased since the inductor-capacitor pole pair, i.e., $L_1$–$C_1$ tends to migrate into the right-half S-plane.

There have been attempts to solve the type B feedback stability problem including increasing the value of $C_1$ of averaging filter 12 to attenuate the feedback gain and achieve zero gain versus frequency crossover before phase inversion occurs at the resonant frequency of inductor $L_2$, and capacitor $C_2$ of power converter filter 16. This technique has generally been successful. Nevertheless, the penalties incurred, that is, large inductor-capacitor ($L_1$–$C_1$) and/or high output noise levels limit the utilization of the aforementioned solution in applications where high performance is of paramount importance, such as computer systems, for example. In addition, load impedance $Z_0$, generally contains additional decoupling capacitors which tend to lower the resonant frequency of $L_2$–$C_2$ of power converter filter 16 causing, thereby, phase inversion to occur at a lower frequency, and in the process, compromising phase stability and gain margin. It has also been found, in practice, that a system utilizing type B feedback has limited application with dynamic loading because of fourth order filter effects which create output ripple voltages in excess of specified limits for high performance systems.

An alternate technique to perform the regulator-converter function that would eliminate the foregoing stability problems can be envisioned by reference to FIG. 1. In this system, a separate pulse width modulated/clock/logic system control 18, for example, is added to drive power converter 14. Type A feedback network 20 is connected as shown providing a closed feedback loop to provide line regulation, i.e., regulation of bulk voltage $V_1$, and an additional type B feedback network connected from the output of power converter filter 16 to the newly added pulse width modulated/clock/logic system control to provide power converter regulation for load variations. Notwithstanding the foregoing system being a solution to the stability problem, the principle disadvantages are the additional cost and size of the control system and bias supplies need to provide the control and bias functions.

OBJECTS OF THE INVENTION

Accordingly, the principle object of the present invention is to eliminate the instability characteristics in a pulse width modulated voltage regulator-converter/pulse converter system having cascaded LC filter networks without compromising the filter networks in terms of cost, size or performance.

It is yet another important object of the present invention to acquire the superior filtering characteristics of a four pole closed loop system while maintaining the stability characteristics of a two pole closed loop system.

SUMMARY OF THE INVENTION

The pulse width modulated voltage regulator-converter/power converter system configuration, according to the invention, by which these and other objects, features and advantages can be accomplished is characterized by having the secondary winding of a regulator converter interstage transformer coupled to a regulator converter power transistor having its collector connected to a bulk or input voltage. The primary winding of the regulator converter interstage transformer is driven by a pulse width modulated/clock/logic system control means connected thereto. A feedback or error signal derived from the output of a power converter filter drives the pulse width modulated/clock/logic system control such that modulated logic signals generated at its output, at the primary winding of the regulator converter interstage transformer, drive, via the secondary winding thereof, the regulator converter power transistor, switching the aforementioned transistor on and off in response thereto. The switched voltage provided is filtered by means of an averaging filter including therein, a transinductor and a shunt capacitor to ground. The primary winding of the transinductor provides the inductance necessary for filtering while the secondary of the transinductor provides a "feedforward" voltage to the input of the power converter filter. The regulated voltage from the averaging filter is applied to a power converter. In addition, the power converter is switched on and off in synchronism with the regulator converter section. Consequently, the switched voltage from the power converter, via a power converter output transformer, is rectified and filtered in the aforementioned power converter filter providing a regulated output voltage.

The secondary winding of the transinductor is phased to aid the voltage at the secondary of the power converter output transformer during the on portion of the pulse width modulated duty cycle and to oppose the voltage at the secondary of the power converter output transformer during the off portion. Accordingly, the conduction cycle of the regulator converter power transistor is coupled directly to the inductor-capacitor of the power converter filter producing an output ripple voltage in phase with the switch voltage of the regulator converter power transistor providing, thereby, stable closed loop regulation. In addition, the DC bias introduced through the secondary winding of the transinductor improves the operating point of the hysteresis loop thereof, the result being, a much higher value of inductance than would have been obtained without the secondary winding. Accordingly, the improved performance permits the use of a smaller inductance in the primary of the transinductor.

The foregoing and other objects, features and advantages of the invention will be apparent from the following, more particular description of the preferred embodiment of the invention as illustrated in the accompanying drawings.

DESCRIPTION OF THE PREFERRED EMBODIMENT

Figure 1:
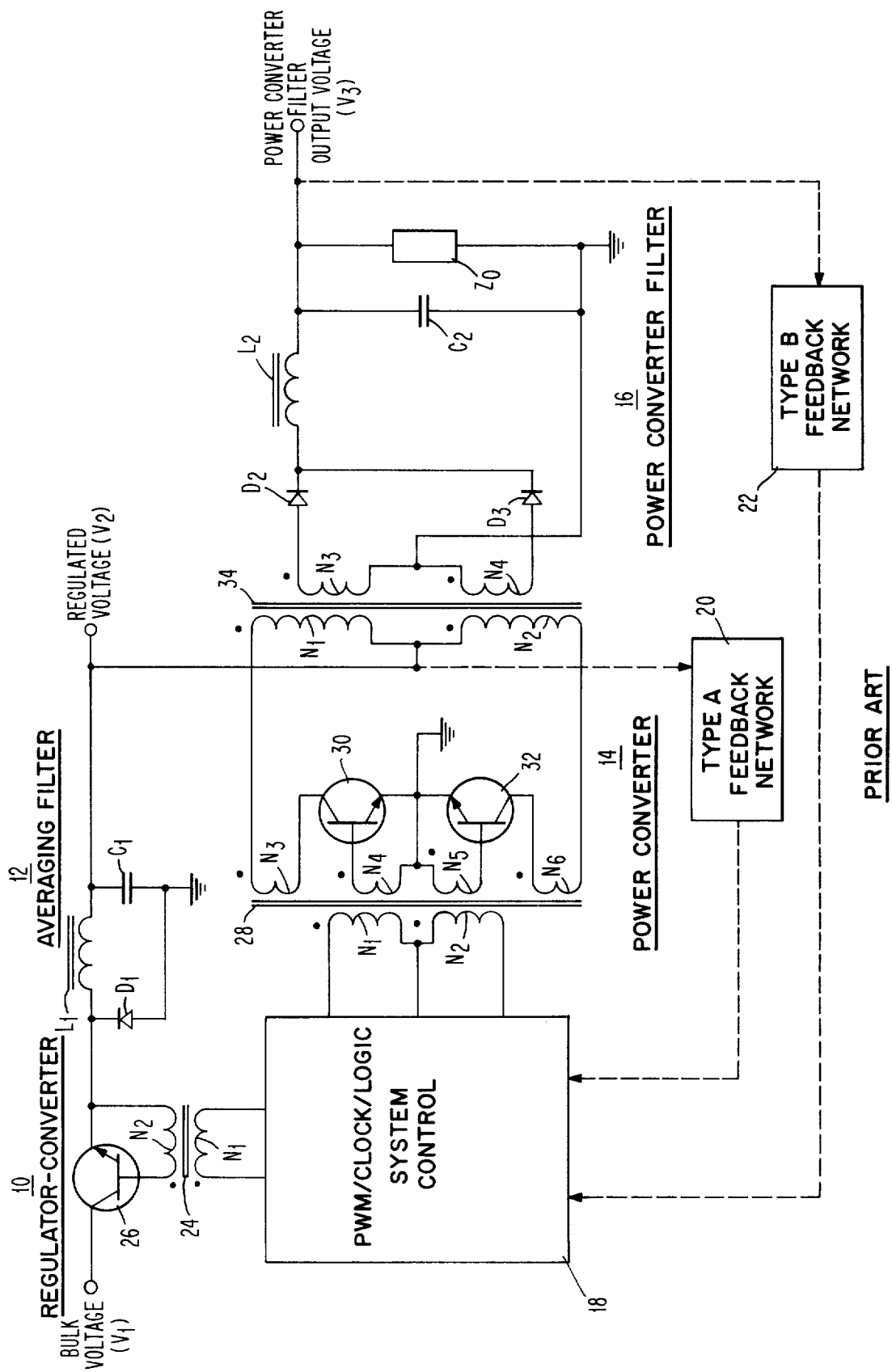
FIG. 1 is a schematic and block diagram representation of a conventional pulse width modulated voltage regulator—converter/power converter system depicting the use of type A feedback or type B feedback.
Figure 2:
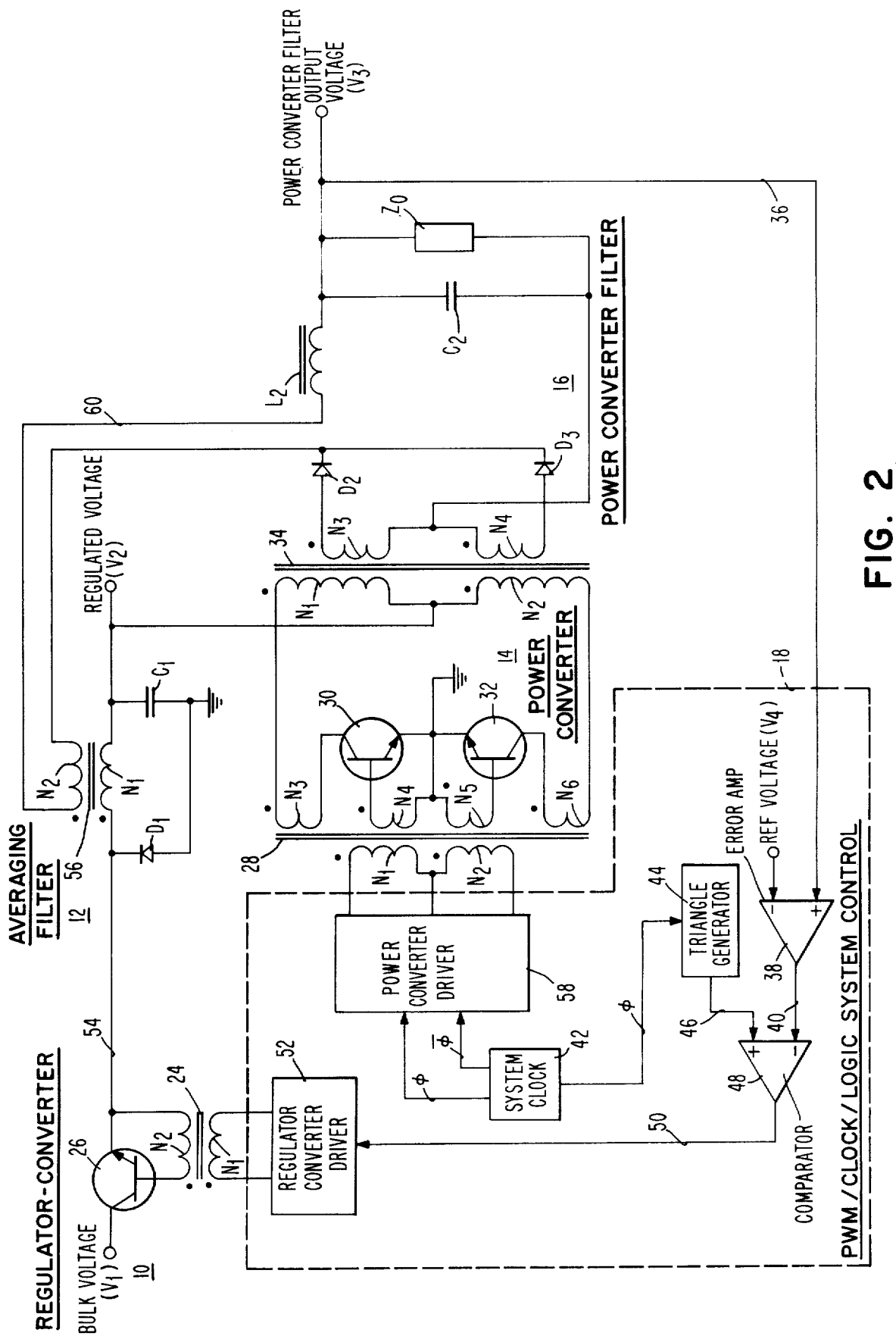
FIG. 2 depicts schematically and in block diagram form a pulse width modulated voltage regulator—converter/power converter system in accordance with the present invention.

One specific pulse width modulated voltage regulator—converter/power converter system, according to the invention, is shown in FIG. 2 as comprising a regulator-converter section 10 including a regulator—converter interstage transformer 24, a pulse width modulated/clock/logic system control 18 for providing modulated pulses which vary in accordance with the magnitude of voltage fluctuations or ripple voltage in regulated output voltage $V_3$, an averaging filter 12 including a transinductor 56 for directly coupling a portion of the switched voltage of regulator-converter power transistor 26 to a power converter filter 16 and a power converter 14 driven by unmodulated clock pulses from pulse width modulated/clock/logic system control 18 for power conversion and voltage conversion of regulated voltage $V_2$ to a regulated output voltage $V_3$.

The pulse width modulated/clock/logic system control 18 includes a regulator converter driver 52. For purposes of the invention, regulator converter driver 52 comprises a current limiting resistor connected between one end of the primary winding $N_1$ of regulator converter interstage transformer 24 and the collector of a switching transistor. Also, good design practice, would necessitate including a diode connected between the collector of the switching transistor and ground to clamp voltage transients generated by the inductance in the circuit when the aforementioned transistor is off. Connecting a bias potential to the other end of primary winding $N_1$ and connecting the emitter of the switching transistor to ground completes the circuit.

Still referring to FIG. 2, regulator converter power transistor 26 having its collector connected to bulk voltage $V_1$ is driven by the secondary winding $N_2$ of regulator converter interstage transformer 24. One end of winding $N_2$ is connected to the base of the aforementioned transistor with the other end of winding $N_2$ connected to the emitter thereof. This connection, via regulator converter power transistor output conductor 54, is joined to averaging filter 12. Averaging filter 12 includes a transinductor 56 having one end of its primary winding $N_1$ connected to the aforementioned regulator converter power transistor output conductor 54 and the other end of primary winding $N_1$ connected to a shunt capacitor $C_1$ to ground. Also, flyback diode $D_1$ connected at regulator converter power transistor output conductor 54 and ground is utilized to provide a closed loop path for current flowing through the primary winding $N_1$ of transinductor 56 when regulator converter power transistor 26 is off. As is well known, due to switching action and the inductance in the circuit, very large voltage transients can be generated at regulator converter power transistor output conductor 54.

Continuing, the regulated voltage $V_2$ at the output of averaging filter 12 is applied directly to the center tap of power converter transformer 34. A feed-forward voltage is fed directly to power converter filter 16 by means of secondary winding N2 of transinductor 56. One end of secondary winding $N_2$ is connected to one end of inductor $L_2$ by means of transinductor secondary conductor 60. The other end of winding $N_2$ is connected to the cathodes of rectification diodes $D_2$ and $D_3$. The anodes of rectification diodes $D_2$ and $D_3$ are connected to secondary windings $N_3$ and $N_4$ of power converter output transformer 34, respectively, forming thereby, a full wave rectifier circuit configuration. In addition, a shunt capacitor $C_2$ is connected at the other end of inductor $L_2$ and ground, completing the configuration of power converter filter 16. Load impedance $Z_0$ is representative of a load suitable to be driven by the system of FIG. 2. For the instant invention, the load $Z_0$ can be resistive, inductive, or capacitive or a combination thereof.

Still referring to FIG. 2, the regulated output voltage $V_3$, containing small voltage fluctuations or ripple voltage, as controlled by averaging filter 12 and power converter filter 16, is applied to the positive or non-inverting input of error amplifier 38 via power converter filter output conductor 36. In addition, a reference voltage $V_4$ is applied to the negative or inverting input of error amplifier 38. Error amplifier 38 is a differential amplifier which operates such that any difference between the output voltage $V_3$, including ripple, and the reference voltage $V_4$ will result in an error signal at error amplifier output conductor 40. Concurrently, system clock 42 generates a plurality of clock pulses $\phi$ and $\bar{\phi}$. For purposes of the invention, system clock 42 includes a 40 Khz RC oscillator, a divide by two circuit to generate the 20 Khz clock pulse $\phi$ and an inverter circuit utilized to provide the corresponding 180° out of phase clock phase $\bar{\phi}$.

Hence, clock pulse $\phi$ drives triangle generator 44 which provides a triangular voltage at triangle generator output conductor 46 connected to the positive or non-inverting input of comparator 48. For purposes of the invention, a triangular voltage is utilized for the operation of comparator 48; however, it is well known that other type voltages such as a ramp voltage, for example, can be utilized for this purpose. The output of comparator 48 at comparator output conductor 50 drives regulator converter driver 52, i.e., the base of the switching transistor previously mentioned. The output of comparator 48 is at an up level or down level depending on the crossover point of the error voltage at the negative terminal and the triangular voltage at the positive terminal thereof (to be discussed more fully in the "Statement of the Operation" hereinafter).

Clock pulses $\phi$ and $\bar{\phi}$, from system clock 42 drive power converter driver 58 which in turn drives the primary windings $N_1$ and $N_2$ of power converter interstage transformer 28 aforementioned. One end of secondary winding $N_4$ is connected to the base of first power converter transistor 30 and one end of secondary winding $N_5$ is connected to the base of second power converter transistor 32. One end of secondary winding $N_3$ is connected to the collector of first power converter transistor 30 with the other end of winding $N_3$ connected to one end of primary winding $N_1$ of power converter output transformer 34. Also, one end of secondary winding $N_6$ is connected to the collector of second power converter transistor 32 with the other end of winding $N_6$ connected to primary winding $N_2$ of power converter output transformer 34 aforementioned. For purposes of the invention, power converter driver 58 and power converter 14 are substantially configurated as disclosed in U.S. Pat. 3,670,234, filed June 30, 1970, by James M. Joyce, entitled "Pulse Width Modulated Voltage Regulator," and assigned to the same assignee as this application; therefore, the aforementioned reference is incorporated herein. It should be noted that power converter interstage transformer 28 is essentially the "current mode" transformer of Joyce. Thus, all of the advantages of the "current mode" connection are reflected in the invention of FIG. 2.

Finally, the embodiment of FIG. 2, can operate with various values of bulk voltage $V_1$ and varying load impedances $Z_0$. In addition, the turns ratio of primary winding $N_1$ and secondary winding $N_2$ of transinductor 56 is not critical. However, for purposes of the invention, primary winding $N_1$ has 80 turns with approximately three amperes flowing therein and secondary winding $N_2$ has two turns with approximately 50 amperes flowing therein under normal operating conditions. It has been found that the aforementioned turns ratio and the current associated therewith has an effect on the magnetic operation point in respect to the hyteresis loop of transinductor 56 resulting in a much higher value of inductance than can be obtained without winding $N_2$. This improvement permits the use of a smaller filter inductor represented by primary winding $N_1$ of transinductor 56.

STATEMENT OF THE OPERATION

Figure 3:
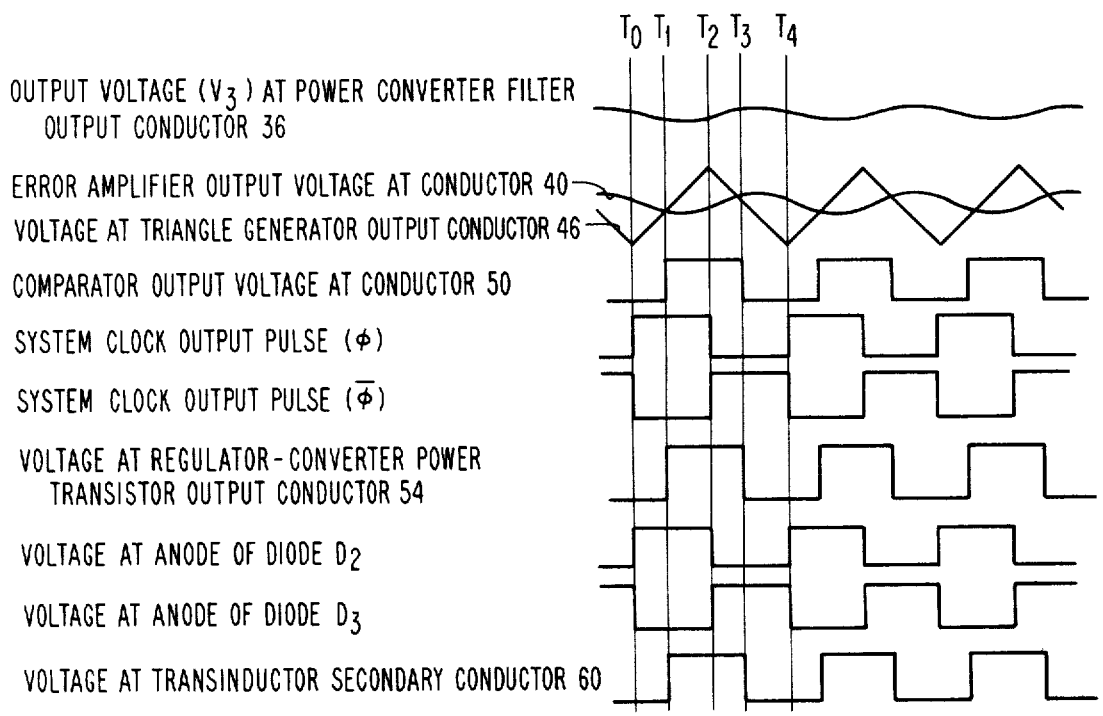
FIG. 3 is a timing diagram showing the interrelationship of the various waveforms of the instant invention as depicted in FIG. 2 during the operation thereof.

Details of the operation, according to the invention, are explained in conjunction with FIGS. 2 and 3 viewed concurrently.

Referring now to FIG. 2 and the timing diagram of FIG. 3, at time $T_0$, regulator converter power transistor 26 is off. Accordingly, the voltage at regulator converter power transistor output conductor 54 is at a down level. Hence, the feedforward voltage at transinductor secondary conductor 60 is also at a down level. Clock pulse $\phi$ is at an up level and clock pulse $\bar{\phi}$ is at a down level, as depicted in FIG. 3. Since clock pulses $\phi$ and $\bar{\phi}$ drive power converter driver 58, which in turn drives power converter 14 via power converter interstage transformer 28, output voltages at secondary windings $N_3$ and $N_4$ of power converter output transformer 34 and at the anodes of diodes of $D_2$ and $D_3$ are in phase with the aforementioned clock pulses. Accordingly, the voltage at the anode of diode $D_2$ is at an up level and the voltage at the anode of diode $D_3$ is at a down level at time $T_0$. Since clock pulse $\phi$ is at an up level at $T_0$, the triangular voltage provided by triangle generator 44 at conductor 46 begins to increase. However, since the error voltage at error amplifier output conductor 40, at this point in time, is greater than the voltage at triangle generator output conductor 46, the output of comparator 48 at conductor 50 is at a down level. This signal feeds regulator converter driver 52. Since the voltage to regulator converter driver 52 is at a down level, no current flows through primary winding $N_1$ of regulator converter interstage transformer 24, and, thus no voltage is coupled to the secondary winding $N_2$; therefore, as aforementioned, regulator converter power transistor 26 is off.

At time $T_1$, the error voltage at error amplifier output conductor 40 is less than the triangular voltage at triangle generator output conductor 46. Accordingly, the output voltage of comparator 48 at comparator output conductor 50 is at an up level. Consequently, regulator converter driver 52 switches on creating, thereby, a plus-minus voltage drop on primary winding $N_1$ of regulator converter interstage transformer 24 with the plus voltage corresponding to the dot plurality on the aforementioned winding. Due to the dot plurality on secondary winding $N_2$, the base of regulator converter power transistor 26 is at a positive level which causes base current to flow turning the aforementioned transistor on. Hence, the voltage at regulator converter power transistor output conductor 54 is at an up level. This voltage, in turn, drives the primary winding $N_1$ of transinductor 56. The inductance of the aforementioned winding along with shunt capacitor $C_1$ filters the switched voltage to provide at the output of averaging filter 12 regulated voltage $V_2$. This voltage is provided at the center tap winding of power converter output transformer 34. Also, a portion of the aforementioned switched voltage, i.e., feedforward voltage, is coupled via secondary winding $N_2$ of transinductor 56 to power converter filter 16. As shown in FIG. 3, the feedforward voltage at transinductor secondary conductor 60, and the voltage at regulator converter power transistor output conductor 54 are in phase. Thus, the secondary winding $N_2$ of transinductor 56 is phased to aid the power converter secondary voltage during the on period of the switched voltage at regulator converter power transistor output conductor 54 and oppose the power converter secondary voltage during the off portion of the switched voltage. As aforementioned, this operation directly couples the conduction cycle of regulator converter power transistor 26 to power converter filter 16 producing an output ripple waveform in phase with the switch voltage at conductor 54 as depicted in FIG. 3.

The aforementioned conditions remain stable until time $T_2$ when clock pulse $\phi$ is at a down level. Accordingly, the output of triangle generator 44 at conductor 46 having reached a maximum positive level begins to decrease. Also, the error voltage at conductor 40 being derived from output voltage $V_3$ and conditioned in error amplifier 38, continues to rise, influenced mainly by the feedforward voltage at transinductor secondary conductor 60. However, since the triangular voltage is still greater than the error voltage, the comparator output voltage at conductor 50 remains at an up level and, accordingly, regulator converter power transistor 26 stays on.

Still referring to FIG. 2 and the waveform diagram of FIG. 3, at time $T_3$ the error voltage at conductor 40 is greater than the triangular voltage at conductor 46. Accordingly, the output of comparator 48 at conductor 50 is at a down level. Hence, as previously described, between the times $T_0$ to $T_1$, regulator converter power transistor 26 is off. Consequently, the voltage at regulator converter power transistor output conductor 54 is at a down level. Thus, the voltage at transinductor secondary conductor 60, i.e., feedforward voltage, is at a down level. As indicated in the waveform diagram of FIG. 3, the circuit conditions remain stable since the output of comparator 48 at conductor 50 remains at a down level. At time $T_4$, a cycle of operation is completed, and the system continues to function as previously described. Finally, the operation of power converter driver 58 and power converter 14 are substantially as indicated in U.S. Pat. 3,670,234 to Joyce, previously mentioned.

While the invention has been particularly described with reference to the preferred embodiment thereof, it will be understood by those skilled in the art that various changes in form and detail may be made therein without departing from the spirit and scope of the invention.

What is claimed is:

1. A pulse width modulated voltage regulator-converter/power converter for regulating and converting a bulk voltage to a stepped down regulated output voltage thereby eliminating instability effects over a wide range of static load conditions comprising, in combination:

control means being responsive to a ripple voltage on said regulated output voltage for generating an amplified pulse width modulated control voltage at a first output, and for generating first and second amplified clock pulses in synchronism therewith at second outputs;

regulator means having a first input connected to said bulk voltage and a second input connected to said first output of said control means for providing a switched voltage at its output substantially equal in amplitude to said bulk voltage and in response to said amplified pulse width modulated control voltage;

averaging filter means connected to said output of said regulator means being responsive to said switched voltage of said regulator means for providing a filtered regulated voltage at a first output, and for providing a feedforward voltage in phase with said switched voltage of said regulator means at second outputs;

said averaging filter means being comprised of a transinductor having a primary and a secondary winding, said primary winding having one end connected to said output of said regulator means and the other end connected to a shunt capacitor to ground, the inductance of said primary winding cooperating with said shunt capacitor providing, thereby, said filtered regulated voltage at said first output of said averaging filter, and said second winding providing said "feedforward" voltage to said second outputs;

said averaging filter being further comprised of a flyback diode means having a cathode connected to said output of said regulator means and an anode connected to ground for clamping voltage transients;

converter means configured in a current mode push-pull circuit having a first input connected to said first output of said averaging filter means, and second inputs connected to said second outputs of said control means providing at its outputs, alternately, stepped down switched regulated voltages in synchronism with said switched voltage of said regulator means, and in response to said amplified clock pulses and said filtered regulated voltage;

full wave rectification means connected to said outputs of said converter means for rectifying said stepped down switched regulated voltages of said converter means, the output of said rectification means being connected to one of said second outputs of said averaging filter means; and converter filter means having a series inductor and a shunt capacitor to ground, one end of said series inductor being connected to the other one of said second outputs of said averaging filter means for filtering said output voltage of said rectification means, and for filtering said feedforward voltage providing, thereby, at a load, said ripple voltage corresponding substantially to said feedforward voltage, and said filtered regulated output voltage corresponding substantially to said stepped down switched regulated voltages, said ripple voltage being in phase with said switched voltage of said regulator means providing thereby stable closed loop load regulation.

2. The pulse width modulated voltage—converter/power converter of claim 1 wherein said regulator means comprises:

a regulator power transistor having its collector connected to said bulk voltage; and a regulator interstage transformer having one end of a secondary winding connected to the base of said regulator power transistor and the other end of said secondary winding connected to the emitter of said regulator power transistor, thereby forming said output of said regulator means, said regulator interstage transformer having a primary winding connected to said first output of said control means such that when said control means generates said amplified pulse width modulated control voltage, said regulator power transistor responds thereto, providing said switched voltage substantially equal in amplitude to said bulk voltage at said output of said regulator means.

3. The pulse width modulated voltage regulator-converter/power converter of claim 1 wherein said secondary winding of said transinductor is phased to aid said output voltage of said rectification means during the on portion of the pulse width modulated duty cycle, and to oppose said output voltage of said rectification means during the off portion of said pulse width modulated duty cycle, whereby the conduction cycle of said regulator power transistor is coupled directly to said converter filter means producing, thereby, said ripple voltage in phase therewith, providing, thereby, stable closed loop regulation; and said flyback diode means clamps voltage transients, due to said inductance of said primary winding of said transinductor to ground when said regulator means is off.

* * * * *